(No Model.)　　　　　　　　　　　　　　　　　6 Sheets—Sheet 1.
W. H. CLARK.
CASH INDICATOR AND REGISTER.

No. 435,397.　　　　　　　　　　Patented Sept. 2, 1890.

Witnesses
A. L. Jackson
G. J. Mead

Inventor
William H. Clark
By H. Sturgeon
Atty.

(No Model.)

W. H. CLARK.
CASH INDICATOR AND REGISTER.

No. 435,397.

6 Sheets—Sheet 3.

Patented Sept. 2, 1890.

Witnesses
A. L. Jackson
G. J. Mead

Inventor
William H. Clark
By H. Sturgeon
Att'y.

(No Model.) 6 Sheets—Sheet 4.
W. H. CLARK.
CASH INDICATOR AND REGISTER.

No. 435,397. Patented Sept. 2, 1890.

Witnesses
A. L. Jackson
G. J. Mead

Inventor
William H. Clark
By H. Sturgeon
Att'y.

(No Model.)

6 Sheets—Sheet 6.

W. H. CLARK.
CASH INDICATOR AND REGISTER.

No. 435,397. Patented Sept. 2, 1890.

Witnesses
A. L. Jackson
G. J. Mead

Inventor
William H. Clark
By [signature]
Att'y.

UNITED STATES PATENT OFFICE.

WILLIAM H. CLARK, OF ALBION, ASSIGNOR OF ONE-FOURTH TO THE LOVELL MANUFACTURING COMPANY, LIMITED, OF ERIE, PENNSYLVANIA.

CASH INDICATOR AND REGISTER.

SPECIFICATION forming part of Letters Patent No. 435,397, dated September 2, 1890.

Application filed October 17, 1889. Serial No. 327,366. (No model.)

*To all whom it may concern:*

Be it known that I, WILLIAM H. CLARK, a citizen of the United States, residing at Albion, in the county of Erie and State of Pennsylvania, have invented certain new and useful Improvements in Cash Indicators and Registers; and I do hereby declare the following to be a full, clear, and exact description of the invention, such as will enable others skilled in the art to which it appertains to make and use the same, reference being had to the accompanying drawings, and to the letters and numerals of reference marked thereon, forming part of this specification.

My invention consists in the improvements in cash indicators and registers hereinafter set forth and explained, and illustrated in the accompanying drawings, in which—

Figure 1:
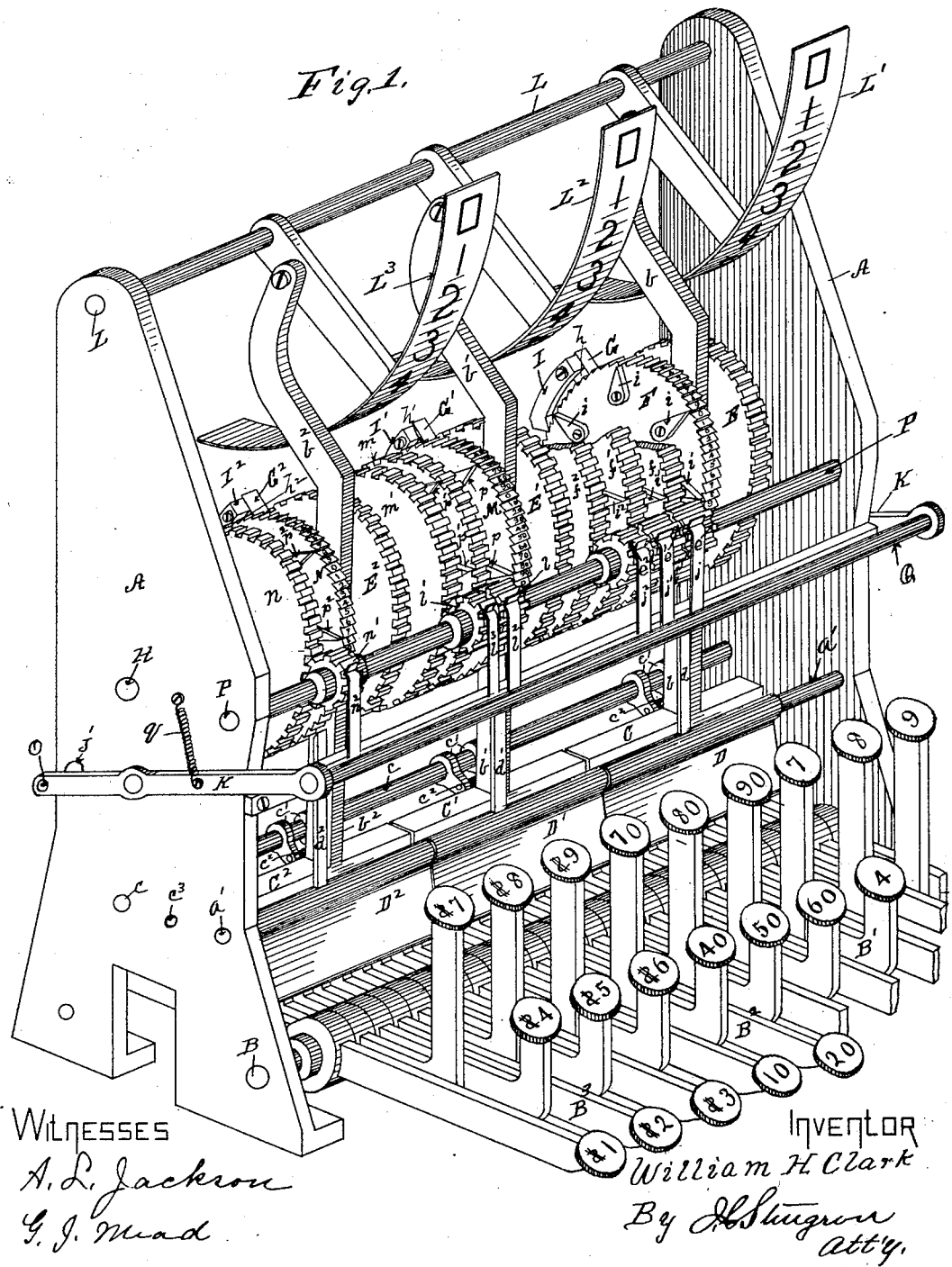
Figure 2:
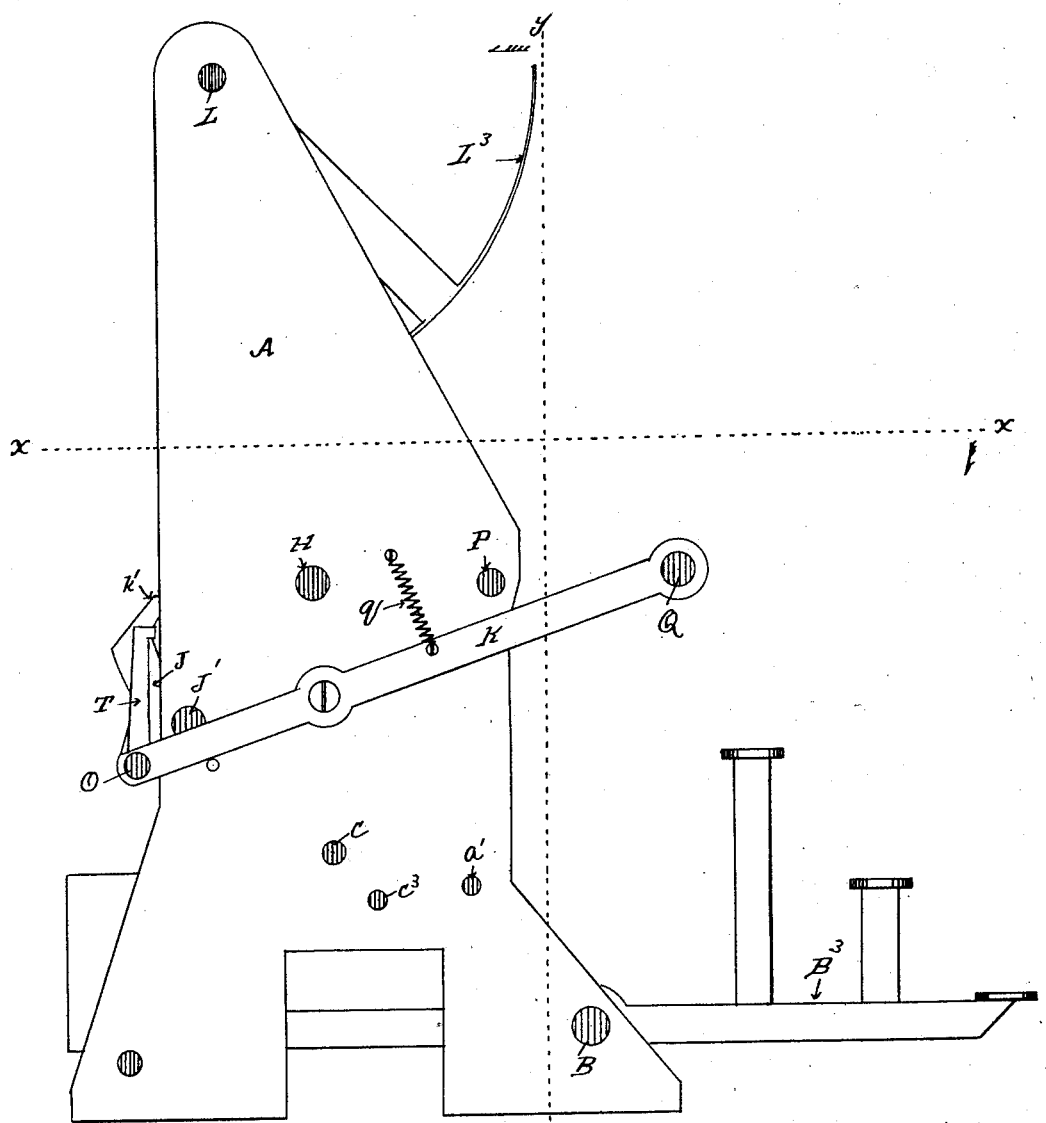
Figure 3:
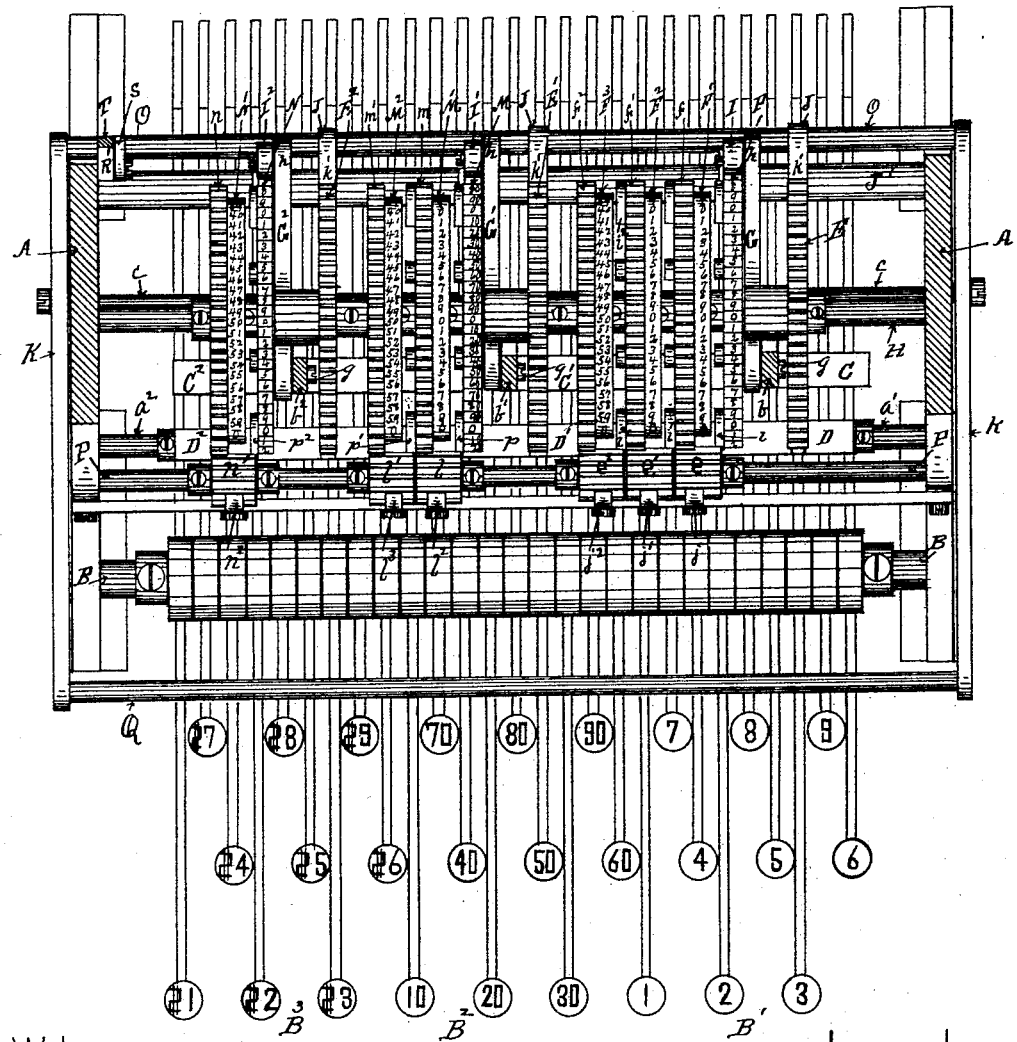
Figure 4:
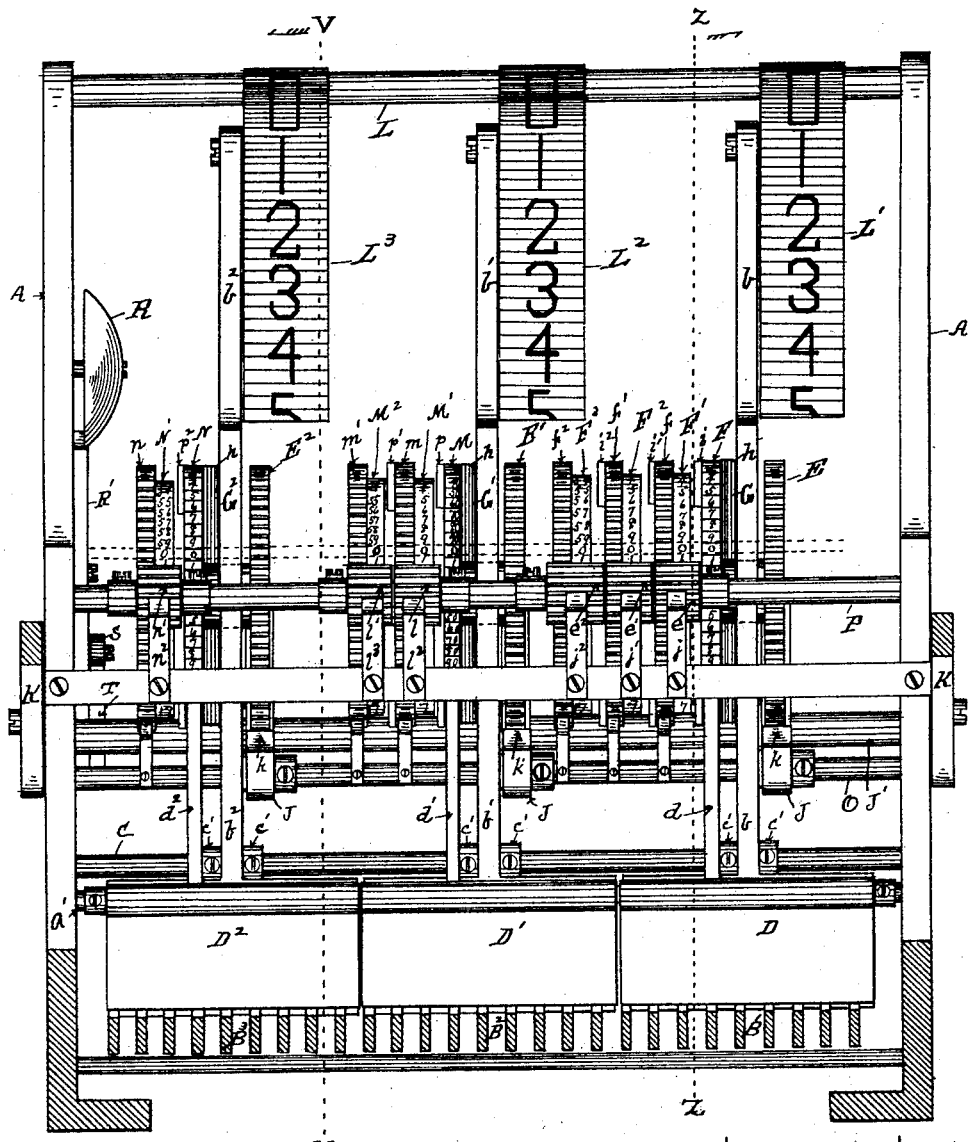
Figure 5:
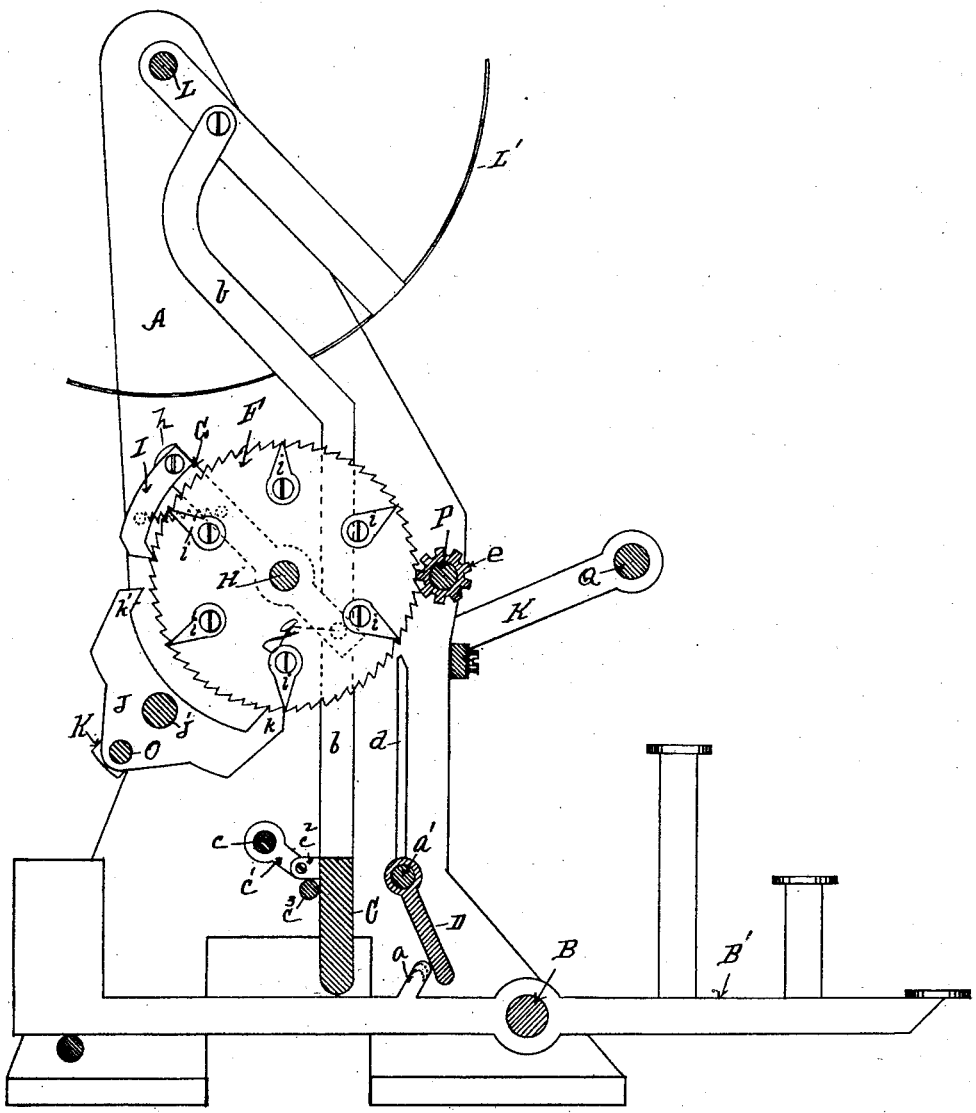
Figure 6:
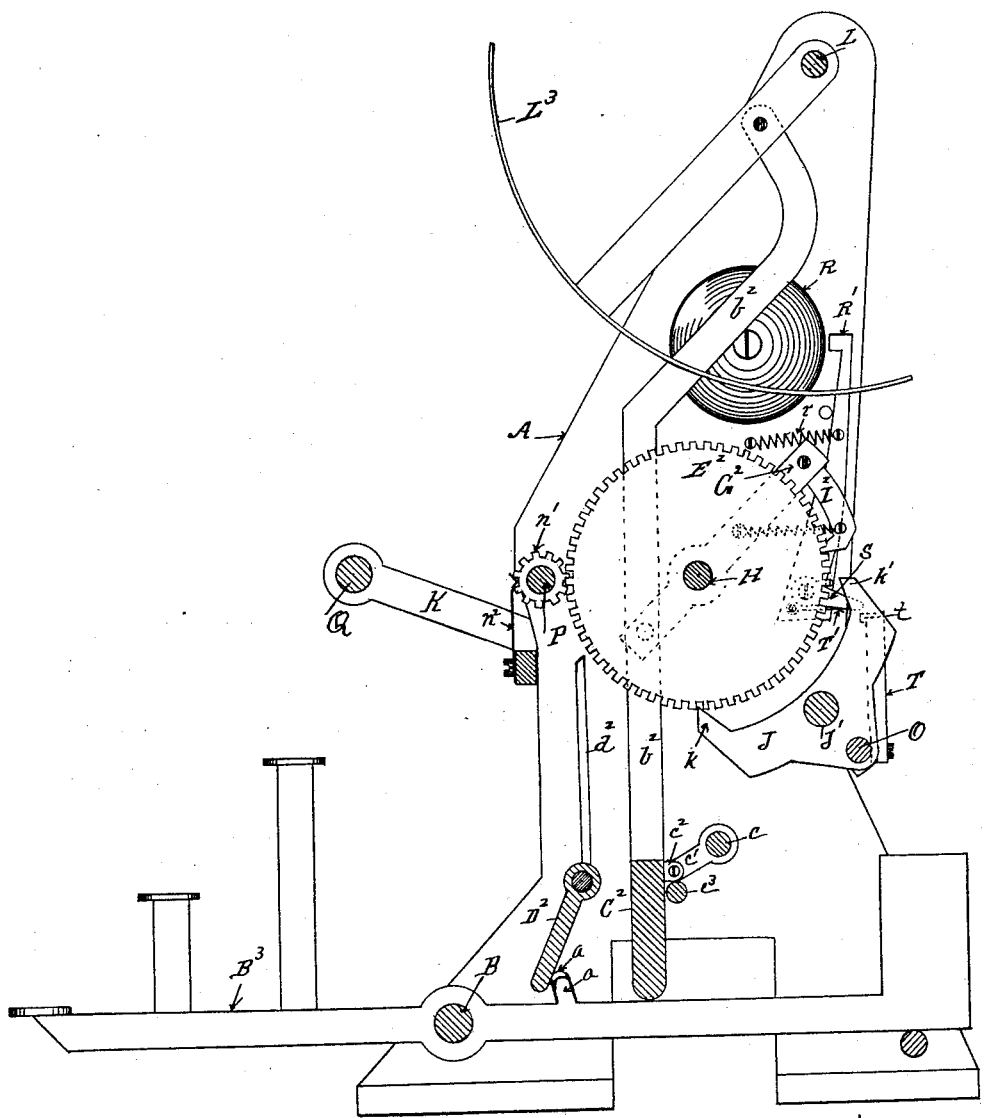

Figure 1 is a perspective view of my improved cash indicator and register. Fig. 2 is a side elevation of the same. Fig. 3 is a sectional plan view of same on the line $x\ x$ in Fig. 2, looking in the direction of the arrow. Fig. 4 is a sectional elevation of the same on the line $y\ y$ in Fig. 2, looking in the direction of the arrow. Fig. 5 is a vertical transverse section of same on the line $z\ z$ in Fig. 4, looking in the direction of the arrow. Fig. 6 is a like vertical transverse section of same on the line $v\ v$, in Fig. 4 looking in the direction of the arrow.

Like letters and numerals refer to like parts in all the figures.

In the construction of my improved cash indicator and register shown in the drawings, A A are the sides of the frame in which the mechanism of my machine, hereinafter described, is mounted.

On a rod B in the base of the frame are mounted three groups $B'$ $B^2$ $B^3$ of nine key-levers each, the group $B'$ being numbered from one to nine cents, inclusive; the group $B^2$ from ten to ninety cents, inclusive; and the group $B^3$ from one to nine dollars, inclusive, as and for the purpose hereinafter set forth.

Upon the group $B'$ the foot C of a vertical bar rests; upon the group $B^2$ the foot $C'$ of a vertical bar $b'$ rests; and upon the group $B^3$ the foot $C^2$ of a vertical bar $b^2$ rests, each of said bars being operated by its respective group of keys.

On the top of the key-levers, in front of the feet C $C'$ $C^2$, are lugs $a$, which project forward at an angle of about forty-five degrees and contact with the rear sides of the feet D, $D'$, and $D^2$ of vertical levers $d\ d'\ d^2$, pivoted on a rod $a'$ extending across the frame of the machine, so that the depression of any one of the key-levers operates to throw the top end of one of the levers $d\ d'\ d^2$ into contact with one of the ratchet or gear wheels hereinafter described, these lugs $a$ being made of different lengths to suit the movement of the key-levers.

At the rear of the feet C, $C'$, and $C^2$ is a rock-shaft $c$, provided with short arms $c'$, coupled to ears $c^2$ on the rear side of the feet C, $C'$, and $C^2$. A cross-bar $c^3$ is also placed across the frame of the machine, upon which the ears $c^2$ rest when the feet C, $C'$, and $C^2$ are down.

Across the frame of the machine, nearly midway from the bottom to the top thereof, I place a shaft or rod H, upon which are mounted three sections of registering mechanism, the first section being operated by means of the group of keys $B'$, and consists of a gear-wheel E, a ratchet registering-wheel F, the registering-wheels $F'$, $F^2$, and $F^3$, gear-wheels $f\ f'\ f^2$, and the pinions $e$, $e'$, and $e^2$ mounted loosely upon the shaft P.

To the hub of the gear-wheel E is secured a rocking lever G, the lower end of which is connected to the upright bar $b$ by means of a pintle $g$, so that the raising of the vertical bar $b$ by the depression of one of the key-levers in the group $B'$ operates to rock the lever G and turn the gear-wheel E on the shaft H, upon which it is loosely mounted. The upper end $h$ of the lever G also extends beyond the periphery of the registering ratchet-wheel F, mounted loosely on the shaft H next to the rocking lever G, and has pivoted to the upper end $h$ thereof a dog I adapted to engage with and rotate the ratchet-wheel F. This ratchet-wheel F is also provided with sixty teeth, numbered serially from 1 to 0, inclusive, and is provided on its left-hand side with six carrying-pawls $i$, equidistant from each other and adapted to engage with and rotate the loose pinion $e$, intermeshing with the loose gear-wheel $f$, forward one tooth as each carrying-pawl $i$ passes it, which operation carries the gear-wheel $f$ and the registering-wheel $F'$ secured thereto forward one notch, this operation being repeated as each of the carrying-pawls $i$ engages in its turn with the pinion $e$. The pinion $e$ is also provided with a spring-dog $j$ adapted to retain it in its normal position until acted upon by the carrying-pawls $i$. The gear-wheel $f$ is also provided with a like number of teeth and with six carrying-pawls $i'$, which in turn engage with a loose pinion $e'$ and operate through it a gear-wheel $f'$ and a registering-wheel $F^2$ secured thereto, and on the gear-wheel $f'$ are also the same number of teeth and carrying-pawls $i^2$, which in turn engage with a loose pinion $e^2$, and operate through it a gear-wheel $f^2$ and a registering-wheel $F^3$ secured thereto, the pinions $e'$ and $e^2$ being provided with spring-pawls $j'$ and $j^2$, which operate on their respective pinions $e'$ and $e^2$ the same as the spring-dog $j$ operates on the pinion $e$, hereinbefore described.

In operation, when one of the group $B'$ of the key-levers is depressed, it operates to raise the foot C of the vertical bar $b$, which operates on the rocking lever G to move the gear-wheel E forward, and at the same time this movement of the key-lever operates to bring the lug $a$ on the key-lever against the rear of the foot D of the vertical lever $d$, which forces the upper end of the lever $d$ into contact with the teeth of the gear-wheel E, so as to stop it at the proper point, thus preventing the momentum of the gear-wheel E from throwing it too far around, and at the same instant the end $k$ of a rocking catch J, pivoted on a rod J' across the machine-frame, drops into the teeth of the gear-wheel E and retains it in the position to which it was rotated by the action of the key-lever until it is released and allowed to turn back to zero by the action of a lever K, pivoted thereto, as hereinafter described. The upper end $k'$ of this rocking catch J also operates to engage with the teeth of the gear-wheel E when the lever K is depressed to stop it at the proper point as it returns to zero. On a rod L at the top of the frame of the machine is also mounted an indicator L' in the form of a segment of a circle, provided with numerals from 0 to 9, inclusive, the upper end of the vertical bar $b$ being coupled to the arm thereof, so that the raising and lowering of the vertical bar $b$ operates to oscillate the indicator-circle L', so as to bring the figure corresponding to the one on the key-lever of the group B' depressed to the reading-line in the case of the machine. (Not shown.)

The construction of the second section of the registering mechanism, operated by the group of key-levers $B^2$, is identical with that of the first section hereinbefore described, with the exception that it has a less number of registering and gear wheels. It consists of a gear-wheel E', mounted loosely upon the shaft H, and having secured to the hub thereof an oscillating lever G', the lower end of which is pivoted to the upright bar $b'$, and actuated thereby, the bar $b'$ being actuated by the group of key-levers $B^2$, operating under the foot C' thereof. To the upper end $h'$ of the oscillating lever G' is pivoted a pawl I', adapted to engage and move forward a registering-wheel M, mounted loosely on the shaft H. This registering-wheel M is provided with sixty teeth, and also six carrying-pawls $p$, which in turn engage with the loose pinion $l$, mounted on the cross-shaft P, this pinion $l$ in turn actuating the gear-wheel $m$ and the registering-wheel M', secured thereto. On the gear-wheel $m$ are also a like number of teeth and carrying-pawls $p'$, which in turn engage with said loose pinion $l'$, this loose pinion $l'$ in turn actuating the gear-wheel $m'$ and the registering-wheel $M^2$, secured thereto. Spring-dogs $l^2$ and $l^3$ operate on the teeth of the pinions $l$ and $l'$ to prevent their movement when not actuated by the carrying-pawls $p$ and $p'$, as hereinbefore described.

When one of the group of key-levers $B^2$ is depressed, it operates to raise the foot C' of the vertical bar $b'$, which operates the rocking lever G' to move the gear-wheel E' forward, and at the same time this movement of the key-lever operates to bring the lug $a$ on the key-lever against the rear of the foot D' of the vertical lever $d'$, which forces the upper end of the lever $d'$ into contact with the teeth of the gear-wheel, so as to stop it at the proper point, and at the same instant the end $k$ of a rocking catch J, pivoted on the rod J', drops into the teeth of the gear-wheel E' and retains it in the position to which it was rotated by the movement of the key-lever, until by the depression of the lever K, connected with the catch J, the catch J is rocked so as to withdraw the lower end $k$ from the teeth of the gear-wheel E' and bring the upper end $k'$ of the said catch J into contact therewith to stop the wheel E' at the proper point.

The registering-wheels M, M', and $M^2$ and the mechanism thereof, hereinbefore described, operate in all respects as that described in the first section of the registering mechanism. The upper end of the vertical bar $b'$ is also coupled to the arm of an oscilating circular indicator $L^2$, mounted on the rod L, which operates in all respects as does the indicator L', referred to and described in the first section.

The third section operated by the group of keys $B^3$ is identical in construction and operation with the first and second sections, hereinbefore described, except that it consists of a less number of gear-wheels and registering-wheels. It consists of the gear-wheel $E^2$, having a stop-lever $d^2$ and a rocking catch J operating thereon, the same as in the sections 1 and 2 hereinbefore described, and to the hub of the gear-wheel $E^2$ is secured a rocking lever $G^2$, coupled to the upright bar $b^2$, and having pivoted to its upper end $h$ a dog $I^2$ adapted to engage with the teeth of a registering ratchet-wheel N. This registering-wheel N has thereon sixty teeth and six carrying-pawls $p^2$, adapted to successively engage a loose pinion $n'$, which in turn actuates a gear-wheel $n$ and registering-wheel N', secured thereto. A spring-dog $n^2$ operates on the pinion $n'$ to prevent its moving, except when actuated by the carrying-pawls $p^2$. An indicating-disk $L^3$, pivoted upon the rod L, is also coupled to the vertical bar $b^2$, all of the mechanism thus described as a part of section 3 being operated by the manipulation of the key-levers in section $B^3$ in the same manner as that hereinbefore described as constituting sections 1 and 2. It will also be observed that the key-levers and the registering and indicating mechanism of each section are entirely independent of the other sections, so that in each of the three sections keys can be simultaneously depressed, each independently operating the registering and indicating mechanism in its own section. It will also be observed that there is a rocking catch J to each of the gear-wheels E, E', and $E^2$, and that they are all pivoted on the rod J', and all are coupled to the rear ends of the levers K by means of a rod O, which passes through them and through the rear ends of the levers K, the levers K being pivoted to the sides A of the machine-frame. The front ends of the levers K are also connected by means of a rod Q, extending across the front of the machine, so as to be convenient for operating the levers K and the rocking catches J, which are operated simultaneously by depressing the rod Q, and on the outer ends of the arms K a retracting-spring $q$ also extends from the sides A of the frame to the levers K to return them to their normal position, at which normal position the points $k$ of the rocking catches J are normally in contact with the teeth of the gear-wheels E, E', and $E^2$, as illustrated in Fig. 6, so that when they are rotated by the action of the key-levers the point $k$ engages to prevent the wheels E, E', and $E^2$ from turning back until released by depressing the outer ends of the levers K.

To one side A of the frame is also secured an alarm-bell R, and a vertical bell-hammer lever R' is also pivoted thereto, which has on its lower end a pivoted dog S. To the rod O is also secured an upright arm T, having a hook $t$ on its upper end adapted to pass over the dog S as it moves upward, but to engage with it as it moves downward. Therefore, when the lever K is depressed and the rod O through the rear ends thereof raised, the hook $t$ passes over the point of the dog S, and when it is returning to its normal position the dog S is depressed, which operation turns back the bell-hammer lever R', and just before the rod O reaches its normal position the hook $t$ slips off of the point of the dog S, allowing the retracting-spring $r$ on the bell-hammer lever R' to return it quickly to its normal position, and causing it to strike the bell R a quick blow, thereby sounding an alarm.

I am aware that cash registering and indicating machines have been made with a group of keys acting upon a horizontal lever, which lever is moved by the operating of keys, so as to actuate a vertically-moving bar coupled thereto, which bar operates a set of registering-wheels and also an indicating device; but this is clearly not my invention as it is hereinafter claimed. I use a series of groups of keys, each of which groups operate a vertically-moving bar, and each of the bars operates a registering-wheel and an independent indicator-wheel only, while the series of such registering-wheels are so connected by carrying devices that they will compute the aggregate of the amounts indicated by the several indicator-wheels.

Having thus fully described my invention so as to enable others to make and use the same, what I claim as new, and desire to secure by Letters Patent of the United States, is—

1. The combination, in a cash indicator and register, of a series of groups of key-levers and a series of vertically-moving bars, each of said bars communicating with and being operated by the key-levers of one of said groups only, with a register-wheel and an oscillating indicator actuated by each of said vertically-moving bars and carrying mechanism between each of said registering-wheels, substantially as and for the purpose set forth.

2. The combination, in a cash indicator and register, of a group of key-levers, a vertically-moving bar having a wide lower end or foot thereon resting upon all of the key-levers of said group and adapted to be operated directly by each key-lever in said group, with registering-wheels and indicator-disks communicating with said vertically-moving bar and adapted to be actuated thereby, substantially as and for the purpose set forth.

3. The combination, in a cash indicator and register, of a series of groups of key-levers, and a series of vertically-moving bars, each of said bars communicating with and being operated by the key-levers of one of said groups only, an indicator wheel or disk operated by each of said vertically-moving bars, an oscillating lever communicating with and actuated by each of said vertically-moving bars, a registering-wheel, and a dog on each oscillating lever adapted to engage with teeth on said registering-wheel, substantially as and for the purpose set forth.

4. The combination, in a cash indicator and register, of a series of groups of key-levers, a series of vertically-moving bars, each having a horizontal foot thereon adapted to rest upon and be actuated by the key-levers of one of said groups only, a set of register-wheels, and an oscillating indicator communicating with and actuated by said vertically-moving bars, with a stop-lever adapted to engage with and stop the register-wheels, and lugs upon said key-levers adapted to engage with and actuate said stop-lever, substantially as and for the purpose set forth.

5. The combination, in a cash indicator and register, of a group of key-levers, a vertically-moving bar having a foot thereon resting upon all of the key-levers of such group and adapted to be actuated by each of said key-levers independently of the others, and registering-wheels and indicator-disks, communicating with and actuated by said vertically-moving key-actuated bars, with a rocking catch, one end $k$ of which automatically engages with the teeth on one of the registering-wheels E, so as to retain it in the position to which it is rotated by the operation of the key-levers, and a releasing-lever coupled to said rocking catch and adapted to withdraw the end $k$ thereof from the wheel E and throw the end $k'$ thereof into engagement therewith, substantially as and for the purpose set forth.

6. The combination, in a cash indicator and register, of a group of key-levers, a vertically-moving bar having a foot thereon resting upon all of the key-levers of said group and adapted to be operated by each of said key-levers independently of the others, an oscillating lever having a dog I thereon and being coupled to said vertically-moving bar, with a registering-wheel having teeth thereon with which the dog I on said oscillating lever engages, a series of fixed carrying-pawls secured to one side of said registering-wheel, a loose pinion adapted to be engaged by said carrying-pawls and rotated thereby, and a gear-wheel intermeshing with said loose pinion and having a registering-wheel secured to and rotating therewith, substantially as and for the purpose set forth.

7. The combination in the registering mechanism of a cash indicator and register, of a key-actuated oscillating lever secured to the hub of a gear or ratchet wheel, a key-actuated stop-lever adapted to engage with said gear or ratchet wheel, an oscillating catch adapted to engage with said gear or ratchet wheel, and levers for operating said oscillating catch, with a dog on said oscillating lever adapted to engage and move a registering-wheel forward, carrying-pawls on said registering-wheel adapted to engage with a loose pinion and move it forward, a gear-wheel intermeshing with and actuated by said loose pinion, and a registering-wheel connected with and carried by said gear-wheel, substantially as and for the purpose set forth.

In testimony whereof I affix my signature in presence of two witnesses.

WILLIAM H. CLARK.

Witnesses:
C. J. STURGEON,
H. J. CURTZE.